United States Patent
Karajani et al.

(10) Patent No.: US 10,256,930 B2
(45) Date of Patent: Apr. 9, 2019

(54) TESTING METHODS AND SYSTEMS FOR MOBILE COMMUNICATION DEVICES

(71) Applicant: Rohde & Schwarz GmbH & Co. KG, München (DE)

(72) Inventors: Bledar Karajani, München (DE); Thorsten Hertel, San Jose, CA (US); Niels Petrovic, München (DE); Ramez Khoury, München (DE); Heinz Mellein, Haar (DE); Johannes Koebele, Offenburg (DE); Juan-Angel Anton, München (DE); Vincent Abadie, Hohenschäftlarn (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 4 days.

(21) Appl. No.: 15/682,020

(22) Filed: Aug. 21, 2017

(65) Prior Publication Data

US 2019/0058535 A1    Feb. 21, 2019

(51) Int. Cl.
*H04B 17/00* (2015.01)
*H04B 17/391* (2015.01)
(Continued)

(52) U.S. Cl.
CPC ........... *H04B 17/3911* (2015.01); *H01Q 3/24* (2013.01); *H01Q 3/26* (2013.01); *H04B 1/40* (2013.01);
(Continued)

(58) Field of Classification Search
CPC ........ H04B 17/3911; H04B 1/40; H04B 7/06; H04B 7/088; H04B 17/0087; H04B 17/14; H04B 17/20; H01Q 3/24; H01Q 3/26
(Continued)

(56) References Cited

U.S. PATENT DOCUMENTS 8,912,963 B2    12/2014 Mow et al.
9,671,445 B2*   6/2017 Huynh .................. G01R 29/10
(Continued)

FOREIGN PATENT DOCUMENTS

WO    WO 2010/139840 A1    12/2010

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Verification of radiated multi-antenna reception performance of User Equipment (UE) (Release 12)," 3GPP TR 37.977 V12.0.0, pp. 1-138 (Jan. 2014).

(Continued)

*Primary Examiner* — Edward F Urban
*Assistant Examiner* — Max Mathew
(74) *Attorney, Agent, or Firm* — Shumaker & Sieffert, P.A.

(57) ABSTRACT

A testing method for testing mobile communication devices comprises measuring a three-dimensional antenna pattern of an active phased antenna array (AAS) of the mobile communication device, with the AAS being maintained at a specific beamforming alignment during the measurement. A predefined base fading profile is calibrated with the measured three-dimensional antenna pattern to obtain an optimized fading profile adapted to the specific beamforming alignment. A channel model for emulation of a base station is emulated on the basis of the optimized fading profile. The method further involves performing a receiver test on the mobile communication device using the emulated channel model. The testing method may in some embodiments be a radiated two-stage over-the-air (RTS-OTA) testing method.

15 Claims, 1 Drawing Sheet

(51) Int. Cl.
*H01Q 3/24* (2006.01)
*H01Q 3/26* (2006.01)
*H04B 7/06* (2006.01)
*H04B 7/08* (2006.01)
*H04B 1/40* (2015.01)
*H04B 17/20* (2015.01)
*H04B 17/14* (2015.01)

(52) U.S. Cl.
CPC .............. *H04B 7/06* (2013.01); *H04B 7/088* (2013.01); *H04B 17/0087* (2013.01); *H04B 17/14* (2015.01); *H04B 17/20* (2015.01)

(58) Field of Classification Search
USPC ...................................................... 455/67.11
See application file for complete search history.

(56) References Cited

U.S. PATENT DOCUMENTS

| | | | | |
|---|---|---|---|---|
| 2010/0285753 | A1* | 11/2010 | Foegelle | H04B 17/21 455/67.12 |
| 2011/0084887 | A1* | 4/2011 | Mow | G01R 29/10 343/703 |
| 2011/0200084 | A1* | 8/2011 | Griesing | H01Q 3/267 375/224 |
| 2012/0071107 | A1* | 3/2012 | Falck | H01Q 3/24 455/67.12 |
| 2012/0100813 | A1* | 4/2012 | Mow | H04B 17/12 455/67.12 |
| 2013/0027256 | A1* | 1/2013 | Guo | H04L 41/0823 343/703 |
| 2015/0030060 | A1* | 1/2015 | Kyosti | H04B 17/391 375/224 |
| 2015/0054687 | A1* | 2/2015 | Reed | H04B 17/0085 342/361 |
| 2015/0349897 | A1* | 12/2015 | Taylor | H04B 17/318 370/252 |
| 2016/0226601 | A1* | 8/2016 | Hu | H04B 7/06 |
| 2016/0344490 | A1* | 11/2016 | Foegelle | H04B 17/3912 |
| 2016/0359573 | A1* | 12/2016 | Pauly | H04B 17/12 |
| 2017/0373773 | A1* | 12/2017 | Jing | H04B 17/318 |
| 2018/0034563 | A1* | 2/2018 | Foegelle | H04B 17/0087 |
| 2018/0062971 | A1* | 3/2018 | Kyosti | H04L 43/50 |

OTHER PUBLICATIONS

"Single-source turnkey solutions for cellular and non-cellular wireless testing," R&S TS8991, OTA Performance Test System, PD 5213.8796.12, Version 02.00, Rhode&Schwarz, pp. 1-24 (Oct. 2016).

Yu et al., "Radiated Two-Stage Method for LTE MIMO User Equipment Performance Evaluation," IEEE Transactions on Electromagnetic Compatibility, vol. 56, No. 6, pp. 1691-1696 (Dec. 2014).

Rumney et al., "Practical active antenna evaluation using the two-stage MIMO OTA measurement method," Antannas and Propagation (EUCAP), 2014 8th European Conference, pp. 1-5 (Apr. 2014).

\* cited by examiner

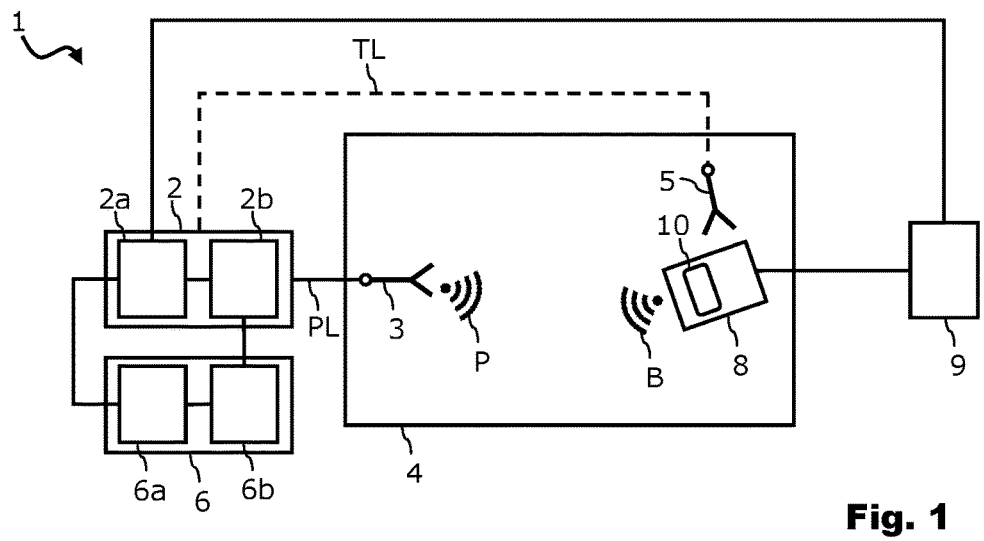
Fig. 1
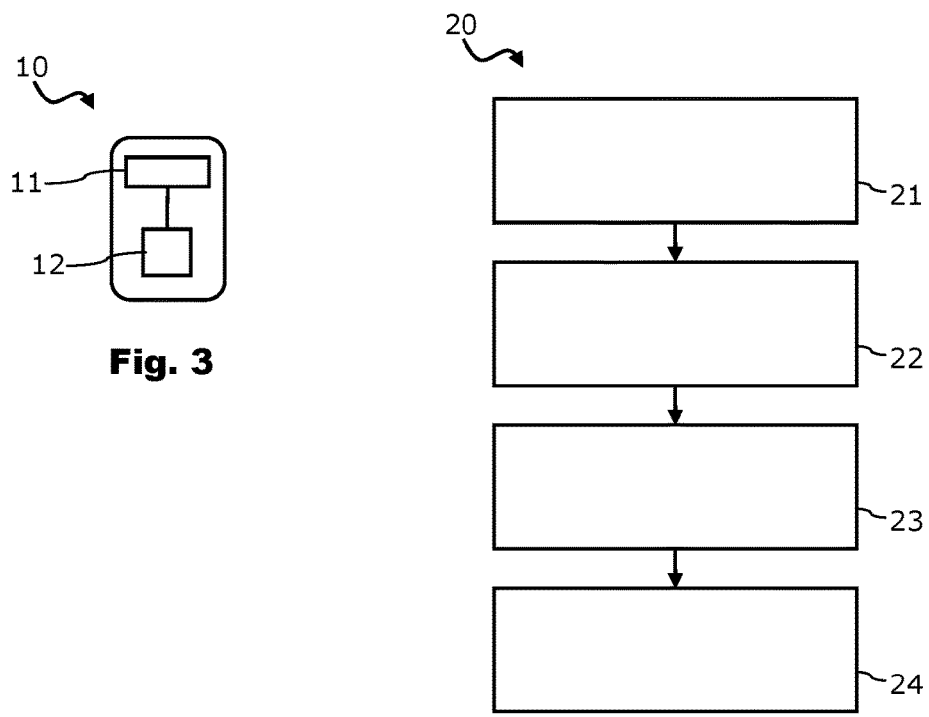
Fig. 3
Fig. 2

TESTING METHODS AND SYSTEMS FOR MOBILE COMMUNICATION DEVICES

FIELD OF THE INVENTION

The present invention relates to testing methods and testing systems for mobile communication devices. Such methods and systems may in particular employ radiated two-stage (RTS) over-the-air (OTA) measurements for a device under test (DUT).

BACKGROUND OF THE INVENTION

Electronic equipment, such as mobile communication devices, is subject to various electronic tests after production. Such tests are generally necessary to ensure proper configuration, calibration and functionality of various elements of the devices under test (DUT). For testing purposes, specific testing devices are employed which simulate a testing environment under predefined testing conditions. For example, testing devices may employ one or more specific testing routines with predefined testing schedules. Those testing schedules regularly involve input of particular test signal sequences into the DUT and/or reception of responses to testing signals input to the DUT. Such responses may be evaluated for consistency, constancy, timeliness and other properties of an expected behaviour of the DUT.

With radio-frequency (RF) communications standards having been stablished for wireless communication systems, ways to characterize such wireless communication systems in various signal propagation environments have become desirable. Environments in which electromagnetic waves propagate are subject to multipath effects such as fading or inter-symbol interference which effects influence the quality of signal transmission. Specifically for Multiple-Input Multiple-Output (MIMO) systems with more than one transmission antenna and more than one reception antenna, it is highly desirable to be able to characterize wireless communication systems under realistic conditions, i.e. with testing being performed over-the-air (OTA).

Equipment manufacturers and operators would like to evaluate DUTs by means of standardized measurements performed in realistic environments. As such, the emulation of multipath propagation channels in a controlled environment representing conditions that are substantially equivalent to the real environments is necessary.

For example, document US 2016/0226601 A1 discloses concepts for testing transmitters and/or receivers of wireless communication systems used in conjunction with antenna arrays. Document WO 2010/139840 A1 discloses a testing method in which a simulated radio channel is shifted with respect to a plurality of antenna elements coupled with an emulator for communicating with a DUT by using different directions for the simulated radio channel in an anechoic chamber. Document U.S. Pat. No. 8,912,963 B2 discloses a test system for testing MIMO systems within a test chamber. Rumney, M.; Kong, H.; Jing, Y.: "Practical active antenna evaluation using the two-stage MIMO OTA measurement method"; 8th Europ. Conf. on Antennas and Propagation (EuCAP) 2014, pp. 3500-3503, discloses methods evaluating the performance of active antenna array systems (AAS) using the two-stage MIMO OTA measurement method.

It would be desirable to find solutions for testing mobile communication devices that improve the characterization process of active antenna those arrays in mobile communication devices.

SUMMARY OF THE INVENTION

According to the disclosure of present invention testing methods and testing systems for mobile communication devices may be implemented.

Specifically, according to a first aspect of the invention, a testing method for testing a mobile communication device includes measuring a three-dimensional antenna pattern of an active phased antenna array, AAS, of the mobile communication device, with the AAS being maintained at a specific beamforming alignment during the measurement. A predefined base fading profile is calibrated with the measured three-dimensional antenna pattern to obtain an optimized fading profile adapted to the specific beamforming alignment. A channel model for emulation of a base station is emulated on the basis of the optimized fading profile. The method further involves performing a receiver test, such as for example a throughput performance test, on the mobile communication device using the emulated channel model. The testing method of the first aspect of the invention may in particular be a radiated two-stage over-the-air (RTS-OTA) testing method for testing MIMO-capable mobile communication devices.

According to a second aspect of the invention, a testing system for testing one or more mobile communication devices comprises a test controller configured to measure a three-dimensional antenna pattern of an active phased antenna array, AAS, of the mobile communication device, with the AAS being maintained at a specific beamforming alignment during the measurement. A channel emulator includes a fading profile generator and a channel model generator. The fading profile generator is configured to calibrate a predefined base fading profile with the measured three-dimensional antenna pattern to obtain an optimized fading profile adapted to the specific beamforming alignment. The channel model generator is configured to emulating a channel model for emulation of a base station on the basis of the optimized fading profile. The test controlled is further configured to perform a receiver test, such as for example a throughput performance test, on the mobile communication device using an emulated channel model from the channel emulator. The testing system of the second aspect of the invention may in particular be a system for radiated two-stage over-the-air (RTS-OTA) testing schemes used to test MIMO-capable mobile communication devices.

One idea of the present invention is to combine a radiated two-stage over-the-air testing scheme with beamforming schedules to measure different antenna patterns associated with different beamforming parameters for an active antenna array of a DUT. The different antenna patterns may be measured in the first stage of the radiated two-stage testing scheme and may serve as calibration parameters for calculating updated fading models to be used in channel emulation of the second stage of the radiated two-stage testing scheme.

Amongst others, there are several specific advantages associated with such testing systems and their concomitant testing methods. By using a RTS OTA measurement method, the antenna patterns may be measured unobtrusively, thereby avoiding the need for complicated cabling. Moreover, any impedance introduced by conventional cable connections is advantageously avoided. Additionally, two-stage approaches allow for emulation of arbitrarily complex 2D or 3D spatial channels is possible by using a simple anechoic chamber with just a few probe antennas for antenna pattern characterization. The orientation of the device under test does not need to be changed relative to the orientation of the probe antenna due to the three-dimensional antenna pattern of the device under test already having been incorporated into the optimized fading profile and, hence, the optimized channel model within the channel emulator. Such incorporation is done by calculation and is therefor free of errors during physical transmission of the testing signals.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

FIG. 1 schematically illustrates a RTS-OTA testing system for testing a DUT according to an embodiment of the invention.

FIG. 2 shows a flowchart of procedural stages of a RTS-OTA testing method for testing a mobile communication device according to a further embodiment of the invention.

FIG. 3 schematically illustrates a mobile communication device to be tested in a RTS-OTA testing system or RTS-OTA testing method according to a further embodiment of the invention.

In all figures of the drawings elements, features and components which are the same or at least have the same functionality have been provided with the same reference symbols, unless explicitly stated otherwise.

DETAILED DESCRIPTION OF THE EMBODIMENTS

Mobile communication devices within the meaning of the present invention include any mobile electronic equipment capable of wirelessly communicating via a mobile communication network. Mobile communication devices may include laptops, notebooks, tablets, smartphones, mobile phones, pagers, PDAs, digital still cameras, digital video cameras, portable media players, gaming consoles, virtual reality glasses, mobile PCs, mobile modems, machine-to-machine (M2M) devices and similar electronic equipment.

FIG. 1 schematically illustrates a testing system 1. The testing system 1 may in particular be a radiated two-stage (RTS) over-the-air (OTA) testing system which is able to perform radiated two-stage MIMO OTA measurement schemes. The testing system 1 is configured to calibrate standardized fading profiles for channel emulation on the basis of measured antenna patterns of active phased antenna array systems (AAS). For measurements of antenna patterns, the testing system 1 is designed to provide intermediate antenna pattern measurements of an AAS. To that end, finite sets of antenna pattern states are generated as a function of beamforming and/or beamsteering parameters in the DUT. The obtained sets of possible antenna pattern states then allow for the performance of the DUT to be evaluated depending on the orientation in the chosen spatial channel model.

RTS OTA measurement schemes involve in a first stage antenna pattern measurements followed by a second stage in which a throughput measurement is performed on the basis of testing signals that are generated as convolution of the measured antenna pattern(s) with a predefined spatial channel model. In RTS methods as approved by 3GPP (cf. Technical Report 37.977, v12.0.0 onwards), the resulting testing signals are applied to a device under test (DUT) via a radiated connection.

An RTS OTA measurement scheme advantageously allows for the emulation of two- or three-dimensional spatial channel models without having to rely on multi-probe anechoic chambers. As such multi-probe anechoic chambers are significantly more complex and therefore more expensive an emulation of spatial channel models that are specifically calibrated towards measured antenna patterns reduces the complexity and time needed to perform throughput tests on the DUT.

The testing system 1 may particularly be configured and adapted to perform a testing method 20 as shown and explained in conjunction with FIG. 3 below. The testing system 1 includes a test controller 2 coupled to one or more antennas in a testing chamber 4. The testing chamber 4 may for example be an anechoic chamber the inner walls of which may be covered with anechoic material. Within the testing chamber 4 a probe antenna 3 may be arranged, the probe antenna 3 being coupled to and controlled by the test controller 2. To that end, the test controller 2 may include a signal generator and analyzer 2b that is configured to generate signals P to be transmitted via the probe antenna 3 and to process signals B received via the probe antenna 3. The test controller 2 may for example be adapted to maintain a probe link PL to the probe antenna 3. Of course, there may be more than one probe antenna 3 and the probe antenna 3 may also be implemented as antenna array, for example a MIMO antenna array.

The signal generator and analyzer 2b may act as a testing front end module that is operationally connectable to one or more mobile communication devices 10 under test. The test controller 2 may control the signal generator and analyzer 2b to output testing signals or to receive probing signals in order to measure gain levels for any desired antenna state pattern set in the mobile communication device 10. The signal generator and analyzer 2b may generally comprise one or more vector signal generators (VSG) for generating and outputting testing signals to the mobile communication devices 10 operatively connected to the test controller 2. Furthermore, the signal generator and analyzer 2b may comprise one or more vector signal analyzers (VSA) for receiving, filtering and evaluating testing response signals from the mobile communication devices 10 as response to one of the testing signals output by the VSG(s). The test controller 2 may in particular emulate a base station of a mobile communication network for testing proper functionality of the connected mobile communication device 10 with regard to network provisioning, network accessibility and network communication.

The test controller 2 may further comprise an antenna pattern measurement device 2a that is configured to measure spatially resolved gain values of antenna patterns depending on the beamforming/beamsteering settings for an active phased antenna array (AAS) in the mobile communication device 10. To that end, the mobile communication device 10 may be mounted on a three-dimensionally rotatable holder platform 8 that allows for orienting the mobile communication device 10 and, hence, the AAS of the mobile communication device 10 in any spatial orientation within the testing chamber 4 as desired. The holder platform 8 may be under control of a platform controller 9 outside the testing chamber 4 that is configured to position the mobile communication device 10 in any desired spatial orientation.

The platform controller 9 is coupled to the antenna pattern measurement device 2a, with the antenna pattern measurement device 2a being able to control the platform controller 9 according to a predefined schedule of spatial orientation patterns in order to measure three-dimensionally resolved antenna gain patterns of the AAS. In other words, the antenna pattern measurement device 2a is configured to set the beamforming properties of the AAS of the mobile communication device 10 to a predefined setting that is maintained during an antenna pattern measurement schedule via the probe antenna 3 during which the platform controller 9 is controlled to set the holder platform 8 to scan the predefined schedule of spatial orientation patterns. In that manner, the antenna pattern measurement device 2a may gather sets of angularly and spatially resolved gain maps of the antennas in the AAS of the mobile communication device 10 as a function of the set of beamforming properties of the AAS.

The antenna pattern measurement device 2a performs those antenna pattern measurements during a first stage of a RTS OTA MIMO test schedule. The antenna pattern measurement device 2a may set the mobile communication device 10 to a test mode where the mobile communication device 10 is capable of measuring the amplitude and relative phase of testing signals incident at the AAS of the mobile communication device 10. By having the mobile communication device 10 rotate on the holder platform 8 three-dimensionally resolved amplitude and relative phase measurements allow for a construction of three-dimensional antenna patterns and phase responses, respectively. A full characterization of the AAS may be established by repeating the antenna pattern measurements at two orthogonal orientations of the probe antenna 3, for example a vertical orientation and a horizontal orientation. Moreover, the antenna pattern measurements may be repeated for different polarizations. To this end, more than one probe antenna 3 or a probe antenna array may be used in the testing chamber 4.

Data for the antenna pattern measurements that are collected on the mobile communication device 10 in a test mode may be transferred to the test controller 2 OTA. To that end, an uplink antenna 5 may be additionally placed in the testing chamber 3 in order to maintain an active uplink air interface TL during antenna pattern measurements. For example, an IP data connection with an associated client application may be used to transfer data from the mobile communication device 10 to the test controller 2 during or after the tests.

The testing system 1 further comprises a channel emulator 6 that is configured to emulate communication channels of a base station with the mobile communication device 10. The emulated communication channels are designed to match realistic conditions of the communication between the mobile communication device 10 and a real base station. The emulation of the communication channels is performed by a channel model generator 6b that generates a channel model to be fed to the signal generator and analyzer 2b of the test controller 2 to emit testing signals to the mobile communication device 10.

The channel model is based on fading profiles generated by a fading profile generator 6a coupled to the channel model generator 6b. The fading profile generator 6a is configured to generate the fading profiles on the basis of pre-stored base fading profiles. Those base fading profiles may for example be standardized fading profiles that represent typical fading conditions in predetermined environments, such as Urban Macro (UMa) or Urban Micro (UMi). The antenna pattern measurement device 2a inputs the measured antenna patterns for the different beamforming/beamsteering settings of the AAS of the mobile communication device 10 into the fading profile generator 6a. The fading profile generator 6a then generates an optimized fading profile for a specific antenna pattern by convolution of the antenna pattern with one of the standardized fading profiles.

In some instances, it may also be possible to measure different antenna sub-patterns associated with distinct beamforming/beamsteering settings of the AAS of the mobile communication device 10 and to combine those antenna sub-patterns to the antenna pattern used to generate the optimized fading profile. Such combination of antenna sub-patterns may for example be performed by averaging the measured antenna sub-patterns to obtain the antenna pattern used to generate the optimized fading profile as averaged pattern.

The second stage of a two-stage MIMO OTA testing scheme may then be performed on the basis of a channel model calculated from such an optimized fading profile. The desired antenna pattern obtained by measurements from the signal generator and analyzer 2b of the test controller 2 is used in the channel model generator 6b to emulate channels of a base station. The emulated channels generate testing signals at the mobile communication device 10 as if the mobile communication device 10 would have been placed using the specific setting of its AAS in the same spatial field used for the convolution.

In particular, there may be multiple measurements of different antenna patterns performed in the test controller 2, with each of the different antenna patterns corresponding to different beamforming/beamsteering settings in the AAS of the mobile communication device 10. Those different antenna patterns may give rise to the calculation of a number of different optimized fading profiles on the basis of a predefined base fading profile. Each of the different optimized fading profiles may then be used to emulate different channel models for each of which a receiver test, i.e. a second stage test of the two-stage MIMO OTA testing scheme, may be performed. The receiver tests based on the different channel models may then be averaged to obtain an overall performance value for the receiver test.

Additionally, it may be possible to first obtain a first antenna pattern by way of measurement in order to calculate a first optimized fading profile. This first optimized fading profile may further be refined by measuring subsequent antenna patterns and to use the subsequently measured antenna patterns to calibrate the first optimized fading profile in order to obtain further optimized fading profile. In other words, a chain of antenna pattern under different beamforming alignment settings may allow for fine-tuning the optimized fading profiles by iterating the calibration procedure.

For simulation of a base station, the signal generator and analyzer 2b of the test controller 2 uses a radiated connection to the mobile communication device 10. Due to the radiated connection being established in the testing chamber 4, any throughput measurements will take into account radiated interferences of the mobile communication device 10. However, with the signals generated by the channel emulator 6 already being specifically adapted to the antenna pattern of the mobile communication device 10 under any setting chosen, the impact of signal propagation within the testing chamber 4 and reception at the mobile communication device 10 is already accounted for.

The RTS OTA testing scheme employed by the testing system 1 may accurately and reliably evaluate performances of mobile communication devices with active phased antenna arrays (AAS). The AAS of the mobile communication device under test should be set to one of a multitude of available antenna patterns depending on the operation conditions in order to obtain the best performance under the given circumstances. With the RTS OTA testing scheme employed by the testing system 1 the selection of an antenna pattern by the mobile communication device 10 may be taken into account when testing which antenna pattern may provide the best performance under which circumstances. Due to the possibility of explicitly measuring the characteristics of each set antenna pattern and correlating the measured antenna patterns with specifically tailored fading profiles, the selection algorithms for the antenna patterns in the AAS of the mobile communication device may be optimized as well.

The channel emulator 6 may be implemented as a central processing unit, a microprocessor, a microcontroller, an ASIC, a FPGA or any similar programmable logic device. The channel emulator 6 may run an operation system specific to the emulator.

FIG. 3 schematically illustrates a mobile communication device 10, such as a smartphone, a tablet or a machine-to-machine (M2M) device, employing an active phased antenna array 11. An active phased antenna array is an array of antenna elements designed to adapt and change the antenna radiation pattern in order to adjust to the radio frequency (RF) environment. Theses adaptations may be realized by performing electrical beam tilting and/or beam width adjustments and may possess the capability to direct beams toward particular users and tracking user movement. The active phased antenna array may also be able to steer nulls, reduce side-lobes and self-heal in case one of the elements in the array stops functioning.

The RF environment of such an active phased antenna array 11 may be polluted by noise, interference signal falling in the band of interest and/or multipath fading effects on the desired frequency. Digital signal processing (DSP) algorithms implemented in a processor 12 of the mobile communication device 10, such as a central processing unit, an ASIC, a FPGA or any similar programmable logic device, may be configured to perform smart beamforming measures, i.e. to adapt the antenna properties of the active phased antenna array 11 according to desired transmit and receive characteristics.

An active phased antenna array may be implemented as one of a switched beam antenna (SBA) and an adaptive antenna array (AAA). A switched beam antenna array is a system typically intended for a cellular base transceiver station (BTS), which has multiple predefined beam pattern designed to enhance the received signal power of a user equipment (UE). The arrangement of antennas at a BTS may be designed to have a triangular structure, with each side of the triangle covering a 120° sector with multiple beams in each sector. Depending on the desired antenna characteristics, one or more of the beams are activated. During transmission, a handover procedure to another subset of beams may be effected in order to, for example, have a better signal strength when the UE changes location.

Adaptive antenna array systems, on the other hand, may have the ability to adjust and adapt their radiation patterns in a more granular fashion, for example by beam steering and/or side-lobe nulling, where beam directions are adjusted in real-time and interference effects are used to enhance or reduce side-lobe strengths.

Mobile communication devices such as the mobile communication device 10 of FIG. 3 may need to be tested with respect to the antennas after manufacture and before shipping in order to ensure proper functionality and desired characteristics of the antennas. Such testing may be performed with the testing system 1 of FIG. 1, for example by employing a testing method 20 as described further below in conjunction with FIG. 2. The mobile communication device 10 of FIG. 3 may serve as device under test (DUT) for the testing system 1 and/or the testing method 20.

FIG. 2 schematically illustrates procedural stages of a testing method 20 for testing mobile communication devices, particularly mobile communication devices 10 as shown and explained in conjunction with FIG. 3. The mobile communication devices 10 to be tested with the testing method 20 may in particular employ active phase antenna arrays (AAS). The testing method 20 may be performed using the testing system 1 of FIG. 1. The testing method 20 may advantageously be used for testing mobile communication devices as devices under test (DUTs).

In the testing method 20, a first step 21 includes measuring a three-dimensional antenna pattern of an active phased antenna array, AAS, of the mobile communication device, with the AAS being maintained at a specific beamforming alignment during the measurement. In a second step 22, a predefined base fading profile is calibrated with the measured three-dimensional antenna pattern to obtain an optimized fading profile adapted to the specific beamforming alignment. In a third step 23, a channel model for emulation of a base station is emulated on the basis of the optimized fading profile. Finally, a fourth step 24 involves performing a receiver test, for example a throughput performance test, on the mobile communication device using the emulated channel model.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatuses implementing the present invention are, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried out, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A testing method for testing a mobile communication device, the method comprising:
   measuring a first three-dimensional antenna pattern of an active phased antenna array (AAS) of the mobile communication device, with the AAS being maintained at a first beamforming alignment during the measurement;
   calibrating a predefined base fading profile with the measured first three-dimensional antenna pattern to obtain an first optimized fading profile adapted to the first beamforming alignment;
   emulating a first channel model for emulation of a base station on the basis of the first optimized fading profile; and
   performing a receiver test on the mobile communication device using the emulated first channel model.

2. The testing method of claim 1, wherein measuring the first three-dimensional antenna pattern of the AAS of the mobile communication device and performing the receiver test are conducted with the mobile communication device being placed in an anechoic testing chamber.

3. The testing method of claim 2, wherein measuring the first three-dimensional antenna pattern of the AAS of the mobile communication device and performing the receiver test are conducted using the same probe antenna within the anechoic testing chamber.

4. The testing method of claim 1, wherein the receiver test is performed over-the-air (OTA).

5. The testing method of claim 1, wherein the first three-dimensional antenna pattern is measured for two orthogonal polarizations.

6. The testing method of claim 1, wherein the mobile communication device is a MIMO-capable device.

7. The testing method of claim 1, wherein the first three-dimensional antenna pattern includes angularly and spatially resolved gain maps of antennas in the AAS of the mobile communication device.

8. A testing method for testing a mobile communication device, the method comprising:
   measuring a first three-dimensional antenna pattern of an active phased antenna array (AAS) of the mobile communication device by measuring at least two antenna sub-patterns associated with at least two different beamforming alignments of the AAS of the mobile communication device, with the AAS being maintained at the at least two different beamforming alignments during the measurement of the at least two antenna sub-patterns;
   combining the at least two antenna sub-patterns to obtain the first three-dimensional antenna pattern;
   calibrating a predefined base fading profile with the measured first three-dimensional antenna pattern to obtain an first optimized fading profile adapted to the first beamforming alignment;
   emulating a first channel model for emulation of a base station on the basis of the first optimized fading profile;
   performing a receiver test on the mobile communication device using the emulated first channel model;
   measuring a second three-dimensional antenna pattern of the AAS of the mobile communication device, with the AAS being maintained at a second beamforming alignment during the measurement, the second beamforming alignment being different from the first beamforming alignment;
   calibrating the first optimized fading profile with the measured second three-dimensional antenna pattern to obtain an second optimized fading profile adapted to the second beamforming alignment;
   emulating a second channel model for emulation of a base station on the basis of the second optimized fading profile; and
   performing a receiver test on the mobile communication device using the emulated second channel model.

9. A testing system for testing one or more mobile communication devices, the testing system comprising:
   a test controller configured to measure a three-dimensional antenna pattern of an active phased antenna array (AAS) of the mobile communication device, with the AAS being maintained at a specific beamforming alignment during the measurement;
   a channel emulator, the channel emulator including a fading profile generator configured to calibrate a predefined base fading profile with the measured three-dimensional antenna pattern to obtain an optimized fading profile adapted to the specific beamforming alignment and a channel model generator configured to emulate a channel model for emulation of a base station on the basis of the optimized fading profile, wherein the test controller is further configured to perform a throughput performance test on the mobile communication device using an emulated channel model from the channel emulator.

10. The testing system of claim 9, further comprising an anechoic testing chamber in which the mobile communication device is placed.

11. The testing system of claim 10, further comprising a probe antenna placed within the anechoic testing chamber and an active air uplink interface antenna placed within the anechoic testing chamber.

12. The testing system of claim 9, wherein the test controller is configured to perform the throughput test over-the-air (OTA).

13. The testing system of claim 9, wherein the test controller is configured to measure the antenna pattern for two orthogonal polarizations.

14. The testing system of claim 9, wherein the mobile communication device is a MIMO-capable device.

15. The testing system of claim 9, wherein the test controller includes an antenna pattern measurement device configured to measure the three-dimensional antenna pattern by measuring angularly and spatially resolved gain maps of antennas in the AAS of the mobile communication device.

* * * * *